UNITED STATES PATENT OFFICE.

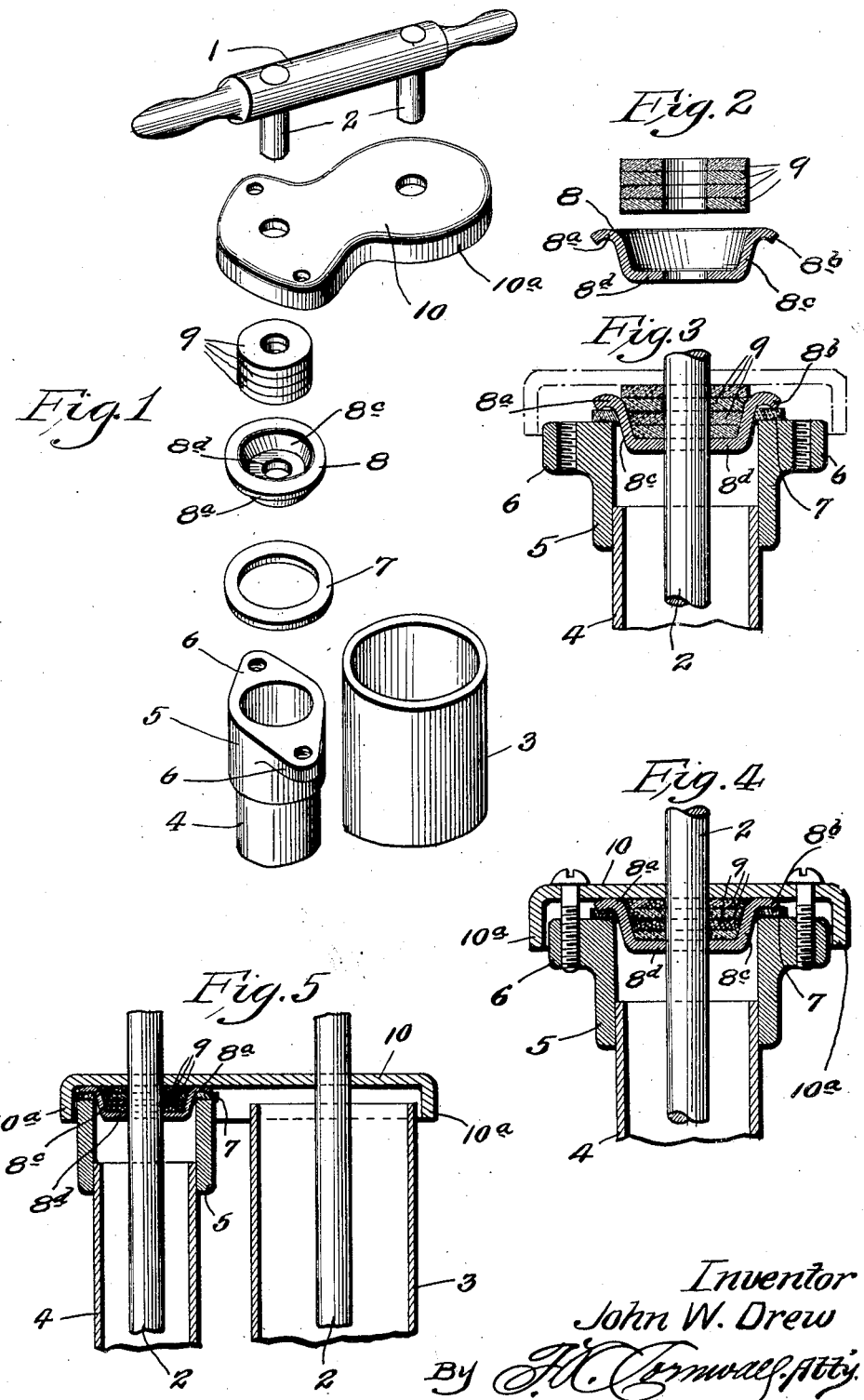

JOHN W. DREW, OF ST. LOUIS, MISSOURI, ASSIGNOR TO MOON BROTHERS MANUFACTURING COMPANY, OF ST. LOUIS, MISSOURI, A CORPORATION OF MISSOURI.

PISTON-ROD PACKING.

1,355,318.   Specification of Letters Patent.   Patented Oct. 12, 1920.

Application filed February 8, 1919. Serial No. 275,738.

*To all whom it may concern:*

Be it known that I, JOHN W. DREW, a citizen of the United States, residing at the city of St. Louis, State of Missouri, have invented a certain new and useful Improvement in Piston-Rod Packing, of which the following is a full, clear, and exact description, such as will enable others skilled in the art to which it appertains to make and use the same, reference being had to the accompanying drawings, forming part of this specification, in which—

Figure 1 is a detail view, showing the parts detached, of my improved piston rod packing.

Fig. 2 is an enlarged sectional view through the dished metallic washer and certain of the packing washers.

Fig. 3 is an enlarged vertical sectional view through the upper end of the small cylinder.

Fig. 4 is a similar view showing the cap piece in position, and

Fig. 5 is a similar view taken at right angles to Fig. 4, but on a reduced scale.

This invention relates to a new and useful improvement in piston rod packing, the object being to provide a simple, cheap and effective means for packing the rod so that the same will operate easily and smoothly and at the same time packing the end of the cylinder in which the rod operates so as to effectually seal the same.

I prefer to use a dish-shaped washer under the marginal edges of which is arranged the packing washer which coöperates with the end of the cylinder while in the concave portion are arranged series of washers provided with openings through which the piston rod passes, said washers coöperating with the tapered side walls of the depression in the dish-shaped washer whereby when the cap piece is secured in position, the washers are crowded inwardly toward the piston rod to make a tight joint.

In the drawings, 1 indicates the handle of a double cylinder pump to which are secured piston rods 2, said rods carrying piston heads, not shown, which latter operate in cylinders 3 and 4. Cylinder 3 is the larger cylinder and initially compresses the air on its downward stroke, while cylinder 4, being the smaller cylinder, finally compresses the air on its up-stroke, and therefore packing must be provided for the upper end of cylinder 4 and the piston rod which passes through its upper end.

5 indicates the casting which is secured to the upper end of cylinder 4, said casting having perforated ears or lugs 6 through which pass the securing bolts for the cap piece hereinafter described.

7 indicates a washer, preferably of leather, in the form of a ring whose opening is substantially coincident with the bore of casting 5 on which casting said washer is designed to be clamped to make an air tight joint.

8 indicates a dish-shaped washer having a marginal flange $8^a$ at its upper edge which marginal flange is curled or bent downwardly slightly at its outer edge, as at $8^b$, so as to engage the washer 7 and tend to crowd the same inwardly toward the tapering walls $8^c$ of the dish-shaped washer, and at the same time press said washer 7 onto the upper face of casting 5. The tapering walls $8^c$ by fitting snugly in the opening of washer 7 tend to expand said washer when the metal dish-shaped washer 8 is pressed downwardly, thus effecting a tight joint between the washer and the upper face of casting 5. The dish-shaped washer is provided with a bottom wall $8^d$ having an opening through which passes the piston rod 2.

9 indicates a series of packing washers preferably made of leather strung on the piston rod 2, as shown, and whose external diameter is preferably substantially the same as the largest internal diameter of the tapered walls of the metal washer 8.

10 indicates a cap piece preferably pressed from metal and provided with depending marginal flanges $10^a$ to give it strength. This cap piece is provided with openings for the piston rods 2 and also with openings registering with openings in the ear 6 of casting 5, whereby the cap piece may be secured in position by means of screws or bolts received in the openings of the lugs 6.

The cap piece 10 extends over the large cylinder 3, but as air is drawn in through the upper end of this cylinder no packing is required at this point, but on the contrary, a space is left between the upper end of cylinder 3 and the cap piece. When the cap piece is applied in position, it will compress the packing washers 9, crowding them down into the tapered recess of the metal washer 8, forcing them inwardly so that they will snugly fit the piston rod and form a tight but easy joint therewith.

When first assembled, the washers 9 are comparatively stiff and have a slight tendency to buckle when crowded into the tapered opening and consequently it is not desirable to force the cap piece fully home when originally assembling the pump.

As the washers 9 wear, this wear will be taken up by the flattening of the washers and as occasion requires the cap piece 10 may be forced down from time to time to further crowd the washers 9 into the tapered opening, thus enabling the maintenance of a tight joint and considerably lengthening the life of the washers.

In crowding the washers 9 into the tapered opening, it is obvious that this pressure is transmitted through the marginal flange of the metal washer 8 onto the packing washer 7 so that all of the washers 9 and 7 are kept under substantially equal pressure at all times.

I have found by experiment that one extra washer, which in the first assemblage of the parts extends above the marginal flange of the metal washer 8 for engagement with the cap piece 10, will enable repeated adjustments of the cap piece in the maintenance of a tight joint and insure a long life to the packing.

It will be readily understood that minor changes in the size, form and construction of the various parts of my improved piston rod packing may be made and substituted for those herein shown and described, without departing from the spirit of my invention, the scope of which is set forth in the following claims.

What I claim is:

1. A piston rod packing, comprising in combination with a cylinder or part thereof, a packing washer arranged against the end of said cylinder, a tapering dish-shaped metal washer for holding the first-mentioned packing washer against the end of the cylinder, a plurality of packing washers embracing the piston rod and arranged within the tapered portion of said dish-shaped washer, and a cap piece bearing against said last mentioned washers and exerting an equal pressure against all of the packing washers mentioned.

2. A piston rod packing, comprising a dish-shaped metallic washer having a curled marginal flange, a packing washer with which said flange coöperates tending to force said packing washer inwardly, said metallic washer also having tapered walls arranged in the opening of said packing washer and tending to expand said packing washer outwardly.

3. A metallic washer for piston rod packings consisting of a dish-shaped disk, the marginal flange of which is curled downwardly and the walls of whose recess forming the dish are tapered.

In testimony whereof I hereunto affix my signature this 5th day of February, 1919.

JOHN W. DREW.